July 5, 1966  B. R. CARTER  3,258,905
TUBULAR STRANDING MACHINES
Filed Dec. 27, 1963  2 Sheets-Sheet 1
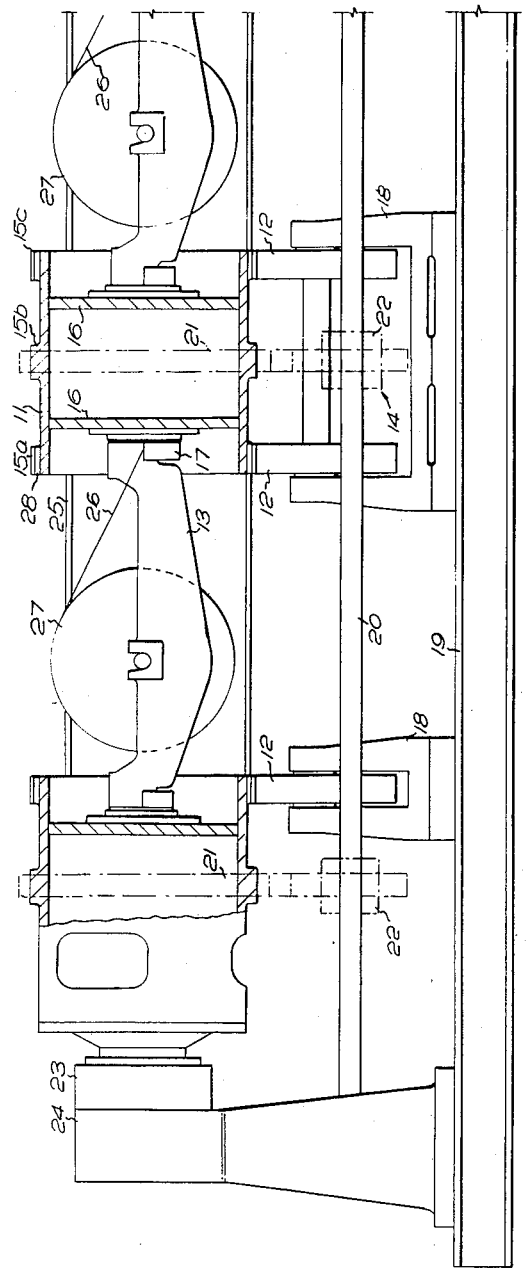
FIG. I
Ben Richard Carter
INVENTOR:
BY
Bierman & Bierman July 5, 1966  B. R. CARTER  3,258,905
TUBULAR STRANDING MACHINES
Filed Dec. 27, 1963  2 Sheets-Sheet 2
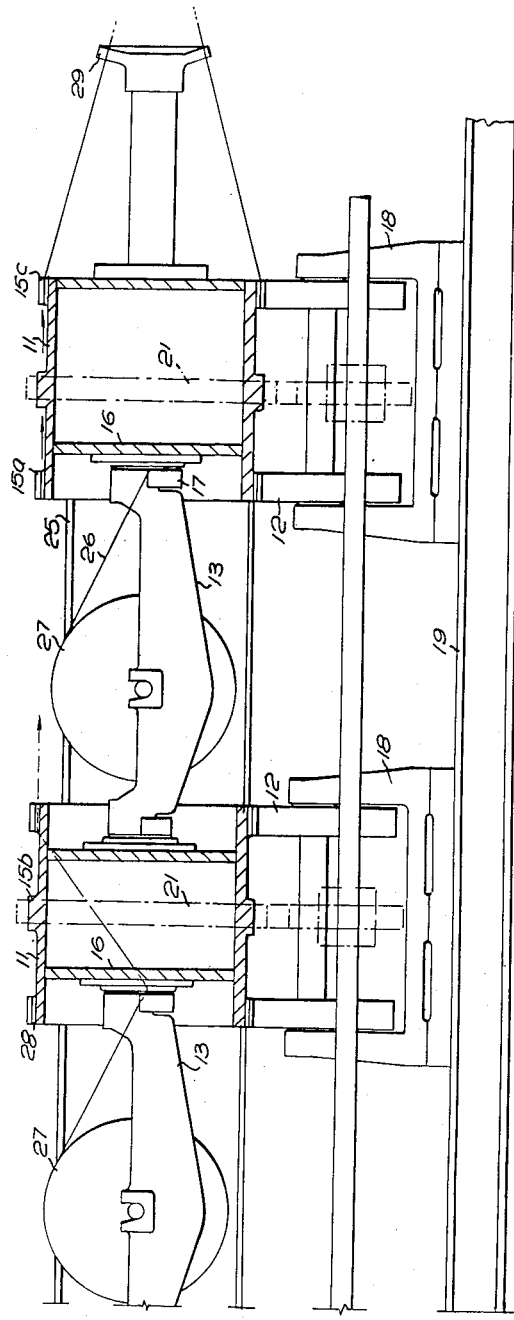
FIG. IA
Ben Richard Carter
INVENTOR:
BY
Bierman & Bierman

United States Patent Office 3,258,905
Patented July 5, 1966

3,258,905
TUBULAR STRANDING MACHINES
Ben R. Carter, Chorley, England, assignor to B. & F. Carter & Company Limited, a company of Great Britain, Northern Ireland, and the Isle of Man
Filed Dec. 27, 1963, Ser. No. 333,855
Claims priority, application Great Britain, Dec. 29, 1962, 48,966/62
6 Claims. (Cl. 57—58.34)

The invention concerns tubular stranding machines.

It is among the objects of the present invention to provide an improved tubular stranding machine.

According to the present invention a tubular stranding machine comprises a multiplicity of axially aligned, rotatably mounted tube sections arranged in spaced apart disposition, a bobbin cradle supported by and between successive such tube sections in self aligning bearings carried thereby, support means for the said tube sections and drive means whereby the tube sections are rotated.

In a preferred embodiment the tube sections are mounted on respective support rollers and a drive is transmitted to each section through a timing belt in engagement with the section and progressed from a common back shaft.

The invention will now be described further, by way of example only, with reference to the accompanying drawings in which FIGURES 1 and 1A assembled end-to-end illustrate one particular embodiment thereof.

Referring now to the drawing a tubular stranding machine comprises six tube sections 11, only two of which are shown, disposed in co-axial spaced relationship and mounted for rotational motion about their common axis on support rollers 12, a bobbin cradle 13 supported by and between each successive such tube section 11, and drive means 14 whereby rotational motion of the tube sections is effected.

Each tube section 11 is cylindrical and has three spaced, radially outwardly directed flanges 15a, 15b, 15c, the central such flange 15b being toothed for a purpose later to be made apparent. Of the remaining flanges one, namely flange 15c, constitutes the brake drum of a caliper braking assembly (not shown). In each tube section 11 are provided two plates 16, the said plates 16 being secured in diametrical planes of the tube and having self aligning bearings 17 positioned centrally thereof, the said bearing 17 each receiving an end of the bobbin cradle 13.

The support rollers 12 are rotationally mounted in journals 18 secured to the machine base 19, four rollers being provided in respect of each tube section, the rollers being paired at opposite ends of the section, the individual rollers of each pair being apaced apart so that the section rests between them, the axes of the rollers of each pair subtending an angle of approximately 70° at the axis of the tube section. The axial position of the rollers 12 relative to each tube section 11 are such that said rollers 12 are aligned with the outermost flanges 15a, 15c of the section.

A drive is applied to each of the tube sections 11 from a back shaft 20 driven in any convenient manner, the drive being transmitted to the central flange 15b of each section 11 by means of a toothed timing belt 21 which passes around a drive pulley 22 on the back shaft 20 and the said central flange 15b. The back shaft 20, the belt 21, and the drive pulley 22 constitute the drive means before referred to.

One extreme end of the machine is supported in thrust bearing 23 in an adjustable bearing housing 24, such bearings 23 allowing of an even distribution of loading on the support rollers 12.

Steel strainer wires 25 are provided between successive tube sections 11, the said wires 25 serving primarily for anti-ballooning purposes.

The wires 26 from the bobbins 27 supported in the cradle 13 pass through bearing 17 and thence through eyelets 28 provided in the flange 15c, the line of the wires being clearly drawn in the drawing, subsequently running parallel to the machine axis until it reaches the nose 29 of the machine. The line of wires is in accordance with standard practice and thus no further description is thought necessary.

We have found in use that the machine hereinbefore described possesses some or all of the following advantages when compared with conventional machines:

(a) The vibration normally associated with stranding machines is reduced considerally, any vibration present being of limited effect only.

(b) There is no torsion through the length of the machine since all the tube sections are driven separately, albeit from a common source, through timing belts.

(c) The construction of the machine facilitates the loading or unloading of bobbins and visibility is much improved.

(d) In view of the open nature of the machine the weight to be driven is less and thus less power will be required than for rotation of a comparable conventional machine at the same speed.

(e) A higher operating speed than with conventional tubular stranding machines is throught possible.

(f) The use of tube sections in the manner proposed and the utilisation of self aligning bearings will allow of a limited flexibility of the machine and will not require critical concentricity of successive tube sections and thus reasonable misalignment of the support journals is acceptable, the tube section being drawn down onto the support rollers by the timing belt.

The invention is not restricted to the particular feature of the embodiment hereinbefore described since alternatives will readily present themselves to one skilled in the art. For example, an alternative method of supporting and rotating the tube sections could be used with equal advantage. In this regard encircling bearings could be used in lieu of the support rollers. The provision of the strainer wires is not thought to be essential, particularly if the machine is of only limited axial extent and thus the tube sections close together.

I claim:

1. A tubular stranding machine comprising a plurality of axially aligned, rotatably-mounted tube sections arranged in spaced apart disposition, support rollers for each said tube section, a drive shaft common to said tube sections, drive means between said shaft and the individual tube sections, bearing means on each said tube section, and bobbins supported by said bearing means and each bobbin having its support extending between and connecting the bearings in two of such tube sections.

2. A tubular stranding machine as claimed in claim 1 wherein a drive pulley is keyed to said drive shaft in alignment with each tube section and a flange is formed on each such section in alignment with the respective pulley, the drive means comprising a timing belt extending about the drive pulley and the respective flange.

3. A tubular stranding machine comprising a multiplicity of axially aligned rotatably mounted tube sections, a thrust bearing at one end of the machine from which the tube sections extend, the said sections being located in spaced apart disposition, support rollers for each tube section, a drive shaft common to said tube sections, drive means between said shaft and the individual tube sections, bearing means on each said tube section, and bobbins supported by the bearing means between and connecting successive tube sections.

4. In a tubular stranding machine which comprises a multiplicity of axially aligned, rotatably-mounted tube sections arranged in spaced apart disposition, support rollers for each said tube section, a drive shaft common to said tube sections, drive means between said shaft and the individual tube sections, bearing means on each said tube section, bobbins supported by said bearing means and connecting and joined to the bearings in successive tube sections, each tube section consisting of a cylindrical body part, a plate adjacent to each end of the said body part, the bearings being positioned centrally of each plate, a peripheral flange on the body part at each end thereof, a peripheral flange intermediate the said ends, and holes through each said flange directed parallel to the axis of the body part, the peripheral flanges at each end of the body part defining support surfaces for the section and resting against the rollers.

5. A tubular stranding machine comprising six axially aligned, rotatably-mounted tube sections arranged in spaced-apart disposition, support rollers for each said tube section, a drive shaft common to said tube sections, drive means between said shaft and the individual tube sections, bearing means on each said tube section, bobbins supported by said bearing means and extending between and connected to successive such tube sections, and strainer wires extending between successive tube sections.

6. A tubular stranding machine comprising, a plurality of axially-aligned, rotatably mounted tube sections arranged in spaced-apart disposition, a bobbin cradle extending between and connecting successive tube sections, each of the tube sections being provided with self-aligning bearings, each cradle being supported between the bearings of two tubes, support means for the tube sections and drive means to rotate the tube sections.

References Cited by the Examiner
UNITED STATES PATENTS

| | | | |
|---|---|---|---|
| 2,147,065 | 2/1939 | Somerville | 57—58.32 |
| 2,162,131 | 6/1939 | Somerville | 57—58.32 |
| 2,416,126 | 2/1947 | Somerville | 57—58.32 |
| 2,477,690 | 8/1949 | French | 57—59 |
| 2,717,485 | 9/1955 | Pearce | 57—58.32 |
| 3,000,169 | 9/1961 | Richaud | 57—58.34 |

FOREIGN PATENTS 600,390    7/1934    Germany.

MERVIN STEIN, *Primary Examiner.*

STANLEY N. GILREATH, *Examiner.*

J. PETRAKES, *Assistant Examiner.*